United States Patent
Kapusniak et al.

(10) Patent No.: US 6,475,602 B1
(45) Date of Patent: *Nov. 5, 2002

(54) INK JET RECORDING ELEMENT

(75) Inventors: Richard J. Kapusniak, Webster, NY (US); Jeanne E. Kaeding, Rochester, NY (US); Dennis E. Smith, Rochester, NY (US); Gregory E. Missell, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 09/608,466

(22) Filed: Jun. 30, 2000

(51) Int. Cl.$^7$ ................................................. B41M 5/00
(52) U.S. Cl. ........................................................ 428/195
(58) Field of Search .................................. 428/195, 327

(56) References Cited

U.S. PATENT DOCUMENTS

| | | |
|---|---|---|
| 5,027,131 A | 6/1991 | Hasegawa et al. |
| 5,194,317 A | 3/1993 | Sato et al. |
| 5,989,701 A | 11/1999 | Goetzen et al. |

FOREIGN PATENT DOCUMENTS

| | | |
|---|---|---|
| EP | 0 802 245 A1 | 10/1997 |
| EP | 0 875 393 A1 | 11/1998 |
| JP | 5222108 | 2/1990 |
| JP | 7172037 | 5/1990 |
| JP | 2055185 | 8/1993 |
| JP | 2127447 | 7/1995 |
| JP | 07137433 | 11/1995 |
| WO | WO 99/41086 | 8/1999 |

*Primary Examiner*—Pamela R. Schwartz
(74) *Attorney, Agent, or Firm*—Harold E. Cole

(57) ABSTRACT

An ink jet recording element comprising an opaque support having thereon an image-receiving layer comprising porous polymeric particles in a polymeric binder, the porous polymeric particles having a median diameter of less than about 1 μm and having a degree of crosslinking of about 27 mole % or greater.

9 Claims, No Drawings

INK JET RECORDING ELEMENT

CROSS REFERENCE TO RELATED APPLICATIONS

Reference is made to commonly assigned, co-pending U.S. patent application Ser. Nos:

09/608,527 by Missell et al., filed of even date herewith, entitled "Ink Jet Printing Method"; and 09/608,465 by Missell et al., filed of even date herewith, entitled "Ink Jet Printing Method" now U.S. Pat. No. 6,328,443;

09/608,842 by Missell et al., filed of even date herewith, entitled "Ink Jet Printing Method"; and 09/607,416 by Missell et al., filed of even date herewith, entitled "Ink Jet Printing Method" now U.S. Pat. No. 6,369,152; and 09/607,417 by Kapusniak et al., filed of even date herewith, entitled "Ink Jet Recording Element" now U.S. Pat. No. 6,380,280;

09/607,419 by Kapusniak et al., filed of even date herewith, entitled "Ink Jet Recording Element" now U.S. Pat. No. 6,376,599;

09/608,969 by Kapusniak et al., filed of even date herewith, entitled "Ink Jet Recording Element";

the disclosures of which are hereby incorporated by reference.

FIELD OF THE INVENTION

This invention relates to an ink jet recording element. More particularly, this invention relates to an ink jet recording element containing porous polymeric particles.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof an ink-receiving or image-forming layer, and includes those intended for reflection viewing, which have an opaque support, and those intended for viewing by transmitted light, which have a transparent support.

While a wide variety of different types of image-recording elements for use with ink jet devices have been proposed heretofore, there are many unsolved problems in the art and many deficiencies in the known products which have limited their commercial usefulness.

It is well known that in order to achieve and maintain photographic-quality images on such an image-recording element, an ink jet recording element must:

Be readily wetted so there is no puddling, i.e., coalescence of adjacent ink dots, which leads to non-uniform density Exhibit no image bleeding Absorb high concentrations of ink and dry quickly to avoid elements blocking together when stacked against subsequent prints or other surfaces Exhibit no discontinuities or defects due to interactions between the support and/or layer(s), such as cracking, repellencies, comb lines and the like Not allow unabsorbed dyes to aggregate at the free surface causing dye crystallization, which results in bloom or bronzing effects in the imaged areas Have an optimized image fastness to avoid fade from contact with water or radiation by daylight, tungsten light, or fluorescent light An ink jet recording element that simultaneously provides an almost instantaneous ink dry time and good image quality is desirable. However, given the wide range of ink compositions and ink volumes that a recording element needs to accommodate, these requirements of ink jet recording media are difficult to achieve simultaneously.

Ink jet recording elements are known that employ porous or non-porous single layer or multilayer coatings that act as suitable image-receiving layers on one or both sides of a porous or non-porous support. Recording elements that use non-porous coatings typically have good image quality but exhibit poor ink dry time. Recording elements that use porous coatings exhibit superior dry times, but typically have poorer image quality and are prone to cracking.

U.S. Pat. Nos. 5,027,131 and 5,194,317 relate to an ink jet recording medium containing polymeric particles in an ink recording layer. However, there is no mention of porous particles.

Japanese Kokai Hei 7[1995]-172037 relates to an ink jet recording sheet containing porous resin particles in an ink recording layer. The preferred multilayered emulsion particles used are disclosed in Japanese Kokai Hei 5[1993]-222108, which teaches that crosslinking monomer in the porous particles should be less than 8%. However, there is a problem with porous particles having a crosslinking monomer of less than 8% in that an ink jet recording sheet containing these particles has poorer dry times, as will be shown hereafter.

Japanese Kokai Hei 2[1990]-127447 relates to transparent plastic sheets containing transparent porous beads which are 4–90 $\mu$m in diameter. However, an ink jet recording sheet containing these particles has low gloss, as will be shown hereafter.

Japanese Kokai Hei 2[1990]-55185 relates to a recording material containing a light-transmitting substrate having thereon an ink-transporting layer containing porous particles with a size of 1–30 $\mu$m. However, these particles coated on an opaque support will have low gloss, as will be shown hereafter.

It is an object of this invention to provide an ink jet recording element that has a fast ink dry time. It is another object of this invention to provide an ink jet recording element that has high gloss.

SUMMARY OF THE INVENTION

These and other objects are achieved in accordance with the invention which comprises an ink jet recording element comprising an opaque support having thereon an image-receiving layer comprising porous polymeric particles in a polymeric binder, the porous polymeric particles having a median diameter of less than about 1 $\mu$m and having a degree of crosslinking of about 27 mole % or greater.

Using the invention, an ink jet recording element is obtained which has better dry time and higher gloss than prior art elements while providing good image quality.

DETAILED DESCRIPTION OF THE INVENTION

As noted above, the support used in the ink jet recording element of the invention is opaque. There may be used, for example, plain papers, resin-coated papers, metal foils, various voided or filled opaque plastics including a polyester resin such as poly(ethylene terephthalate), poly(ethylene naphthalate) and poly(ester diacetate), and the like. The thickness of the support employed in the invention can be from about 12 to about 500 µm, preferably from about 75 to about 300 µm.

The porous polymeric particles which are used in the invention are in the form of porous beads, porous irregularly shaped particles, or are aggregates of emulsion particles.

Suitable porous polymeric particles used in the invention comprise, for example, acrylic resins, styrenic resins, or cellulose derivatives, such as cellulose acetate, cellulose acetate butyrate, cellulose propionate, cellulose acetate propionate, and ethyl cellulose; polyvinyl resins such as polyvinyl chloride, copolymers of vinyl chloride and vinyl acetate and polyvinyl butyral, polyvinyl acetal, ethylene-vinyl acetate copolymers, ethylene-vinyl alcohol copolymers, and ethylene-allyl copolymers such as ethylene-allyl alcohol copolymers, ethylene-allyl acetone copolymers, ethylene-allyl benzene copolymers, ethylene-allyl ether copolymers, ethylene acrylic copolymers and polyoxy-methylene; polycondensation polymers, such as, polyesters, including polyethylene terephthalate, polybutylene terephthalate, polyurethanes and polycarbonates.

In a preferred embodiment of the invention, the porous polymeric particles are made from a styrenic or an acrylic monomer. Any suitable ethylenically unsaturated monomer or mixture of monomers may be used in making such styrenic or acrylic polymer. There may be used, for example, styrenic compounds, such as styrene, vinyl toluene, p-chlorostyrene, vinylbenzylchloride or vinyl naphthalene; or acrylic compounds, such as methyl acrylate, ethyl acrylate, n-butyl acrylate, n-octyl acrylate, 2-chloroethyl acrylate, phenyl acrylate, methyl- a-chloroacrylate, methyl methacrylate, ethyl methacrylate, butyl methacrylate; and mixtures thereof In another preferred embodiment, methyl methacrylate is used.

Typical crosslinking monomers used in making the porous polymeric particles used in the invention are aromatic divinyl compounds such as divinylbenzene, divinylnaphthalene or derivatives thereof; diethylene carboxylate esters and amides such as ethylene glycol dimethacrylate, diethylene glycol diacrylate, and other divinyl compounds such as divinyl sulfide or divinyl sulfone compounds. Divinylbenzene and ethylene glycol dimethacrylate are especially preferred. The porous polymeric particles have a degree of crosslinking of about 27 mole % or greater, preferably about 50 mole %, and most preferably about 100 mole %. The degree of crosslinking is determined by the mole % of multifunctional crosslinking monomer which is incorporated into the porous polymeric particles.

The porous polymeric particles used in this invention can be prepared, for example, by pulverizing and classification of porous organic compounds, by emulsion, suspension, and dispersion polymerization of organic monomers, by spray drying of a solution containing organic compounds, or by a polymer suspension technique which consists of dissolving an organic material in a water immiscible solvent, dispersing the solution as fine liquid droplets in aqueous solution, and removing the solvent by evaporation or other suitable techniques. The bulk, emulsion, dispersion, and suspension polymerization procedures are well known to those skilled in the polymer art and are taught in such textbooks as G. Odian in "Principles of Polymerization", 2nd Ed. Wiley (1981), and W. P. Sorenson and T. W. Campbell in "Preparation Method of Polymer Chemistry", 2nd Ed, Wiley (1968).

Techniques to synthesize porous polymer particles are taught, for example, in U.S. Pat. Nos. 5,840,293; 5,993,805; 5,403,870; and 5,599,889, and Japanese Kokai Hei 5[1993]-222108, the disclosures of which are hereby incorporated by reference. For example, an inert fluid or porogen may be mixed with the monomers used in making the porous polymer particles. After polymerization is complete, the resulting polymeric particles are, at this point, substantially porous because the polymer has formed around the porogen thereby forming the pore network. This technique is described more fully in U.S. Pat. No. 5,840,293 referred to above.

A preferred method of preparing the porous polymeric particles used in this invention includes forming a suspension or dispersion of ethylenically unsaturated monomer droplets containing the crosslinking monomer and a porogen in an aqueous medium, polymerizing the monomer to form solid, porous polymeric particles, and optionally removing the porogen by vacuum stripping. The particles thus prepared have a porosity as measured by a specific surface area of about 35 $m^2/g$ or greater, preferably 100 $m^2/g$ or greater. The surface area is usually measured by B.E.T. nitrogen analysis known to those skilled in the art.

The porous polymeric particles may be covered with a layer of colloidal inorganic particles as described in U.S. Pat. Nos. 5,288,598; 5,378,577; 5,563,226 and 5,750,378, the disclosures of which are incorporated herein by reference. The porous polymeric particles may also be covered with a layer of colloidal polymer latex particles as described in U.S. Pat. No. 5,279,934, the disclosure of which is incorporated herein by reference.

The porous polymeric particles used in this invention have a median diameter of less than about 1 µm, preferably less than about 0.6 µm. Median diameter is defined as the statistical average of the measured particle size distribution on a volume basis. For further details concerning median diameter measurement, see T. Allen, "Particle Size Measurement", 4th Ed., Chapman and Hall, (1990).

As noted above, the polymeric particles used in the invention are porous. By porous is meant particles which either have voids or are permeable to liquids. These particles can have either a smooth or a rough surface.

The polymeric binder used in the invention may comprise a poly(vinyl alcohol), a gelatin, a cellulose ether, polyvinylpyrrolidone, poly(ethylene oxide), etc. The image-receiving layer may also contain additives such as pH-modifiers like nitric acid, cross-linkers, rheology modifiers, surfactants, UV-absorbers, biocides, lubricants, water-dispersible latexes, mordants, dyes, optical brighteners etc.

The image-receiving layer may be applied to one or both substrate surfaces through conventional pre-metered or post-metered coating methods such as blade, air knife, rod, roll, slot die, curtain, slide, etc. The choice of coating process would be determined from the economics of the operation and in turn, would determine the formulation specifications such as coating solids, coating viscosity, and coating speed.

The image-receiving layer thickness may range from about 5 to about 100 µm, preferably from about 10 to about 50 µm. The coating thickness required is determined through the need for the coating to act as a sump for absorption of ink solvent.

Ink jet inks used to image the recording elements of the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the recording elements disclosed herein have been referred to primarily as being useful for ink jet printers, they also can be used as recording media for pen plotter assemblies. Pen plotters operate by writing directly on the surface of a recording medium using a pen consisting of a bundle of capillary tubes in contact with an ink reservoir.

The following examples further illustrate the invention.

EXAMPLES

Example 1

Dry Time

Preparation C1—Synthesis of Control Polymeric Particles with 35 wt. % (21 mole %) Crosslinking To a beaker were added the following ingredients: 195 g methyl methacrylate and 105 g ethylene glycol dimethacrylate as a monomer mixture, 92 g toluene as a porogen, 8 g hexadecane, 10.8 g dioctyl ester of sodium sulfosuccinic acid (Aerosol OT-100®), and 5.6 g 2,2'-azobis(2,4-dimethylvaleronitrile), Vazo 52® (DuPont Corp.). The ingredients were stirred until all the solids were dissolved.

To this solution were added 1200 g distilled water. The mixture was then stirred with a marine prop type agitator for 5 minutes to form a crude emulsion. The crude emulsion was passed twice through a Gauling® colloid mill set at 3600 rev./min., 0.25 mm gap, and 3.8 kg/minute throughput. The resulting monomer droplet dispersion was placed into a 2-liter three-necked round bottom flask. The flask was placed in a 50° C. constant temperature bath and the dispersion stirred at 140 rev./min. under positive pressure nitrogen for 16 hours to polymerize the monomer droplets into porous polymeric particles. The product was filtered through a coarse filter to remove coagulum. Next, toluene and some water were distilled off under vacuum at 70° C. to give 32.5% solids. The porous polymeric particles were measured by a particle size analyzer, Horiba LA-920®, and found to be 0.6 $\mu$m in median diameter. A dried portion of the dispersion, analyzed by B.E.T. Multipoint using a Quantachrome Corp., NOVA 1000® analyzer had a specific surface area of 29.36 m$^2$/g.

Preparation C2—Synthesis of Control Polymeric Particles with 40 wt. % (25 mole %) Crosslinking This preparation was prepared the same as Control Preparation C1 except that the monomer mixture was 180 g methyl methacrylate and 120 g ethylene glycol dimethacrylate. The resulting porous polymeric particles were 0.6 $\mu$m in median diameter and had a specific surface area of 30.74 m$^2$/g.

Preparation C3—Synthesis of Control Polymeric Particles per Example 1 in Japanese Kokai Hei 7[1995]-172037

Part A:

To a five liter, 3-necked, round bottom flask, equipped with a condenser and Teflon® paddle stirrer, was added 2500 g distilled water. The water was purged with nitrogen, heated to 80° C., and 1.5 g potassium persulfate dissolved in the water. The rest of the reaction was done under positive pressure nitrogen. Next, a mixture of 7 g distilled water, 0.2 g sodium dodecylsulfate, 16 g styrene, 0.3 g methacrylic acid, and 0.2 g divinylbenzene (DVB-HP®, Dow Chemical Corp.) was added over one minute to the five liter flask. The flask contents were stirred for one hour at 80° C. A mixture of 40 g water, 0.3 g sodium dodecylsulfate, 55 g methyl methacrylate, 5 g butyl methacrylate, and 40 g methacrylic acid was added to the flask over one hour. The contents of the flask were stirred and heated for another hour. Then 3 g ammonium persulfate, dissolved in 30 g water, was added to the flask. A mixture of 240 g water, 1.2 g sodium dodecylsulfate, 468 g methyl methacrylate, 120 g butyl methacrylate, and 12 g methacrylic acid were next added over one hour. The flask was heated and stirred for two hours at 80° C., then cooled to room temperature and filtered through a coarse filter.

Part B:

Into a 3-liter three-necked round bottom flask, equipped with a condenser, Teflon® paddle stirrer, and positive pressure nitrogen, was placed 490 g of the resultant latex from Part A above and 780 g distilled water. The flask contents were purged with nitrogen, and 8.5 g concentrated ammonium hydroxide (28% in water) added to the flask. The flask was then heated to 85° C., and stirred at 85° C. for 0.5 hour. A mixture of 120 g water, 0.6 g sodium dodecylsulfate, 297 g styrene, and 3 g acrylonitrile was added over 1.5 hours. The flask was stirred at 85° C. for 2 hours, cooled to room temperature, and filtered through a coarse filter. The dispersion was 22.7% weight solids. The resulting porous polymeric particles were 0.3 $\mu$m in median diameter and had a specific surface area of 30.49 m$^2$/g.

Preparation 1—Synthesis of Porous Polymeric Particles with 45 wt. % (29 mole %) Crosslinking (Invention)

This preparation was prepared the same as Control Preparation C1 except that the monomer mixture was 165 g methyl methacrylate and 135 g ethylene glycol dimethacrylate. The resulting porous polymeric particles were 0.6 $\mu$m in median diameter and had a specific surface area of 37.2 m$^2$/g.

Preparation 2—Synthesis of Porous Polymeric Particles with 50 wt. % (34 mole %) Crosslinking (Invention)

This preparation was prepared the same as Control Preparation C1 except that the monomer mixture was 150 g methyl methacrylate and 150 g ethylene glycol dimethacrylate. The resulting porous polymeric particles were 0.6 $\mu$m in median diameter and had a specific surface area of 43.63 m$^2$/g.

Preparation 3—Synthesis of Porous Polymeric Particles with 55 wt. % (38 mole %) Crosslinking (Invention)

This preparation was prepared the same as Control Preparation C1 except that the monomer mixture was 135 g methyl methacrylate and 165 g ethylene glycol dimethacrylate. The resulting porous polymeric particles were 0.6 $\mu$m in median diameter and had a specific surface area of 57.21 m$^2$/g.

Preparation 4—Synthesis of Porous Polymeric Particles with 60 wt. % (43 mole %) Crosslinking (Invention)

This preparation was prepared the same as Control Preparation C1 except that the monomer mixture was 120 g methyl methacrylate and 180 g ethylene glycol dimethacrylate. The resulting porous polymeric particles were 0.6 $\mu$m in median diameter and had a specific surface area of 68.71 m$^2$/g.

Preparation 5—Synthesis of Porous Polymeric Particles with 70 wt. % (54 mole %) Crosslinking (Invention)

This preparation was prepared the same as Control Preparation C1 except that the monomer mixture was 90 g methyl methacrylate and 210 g ethylene glycol dimethacrylate. The resulting porous polymeric particles were 0.6 μm in median diameter and had a specific surface area of 95.76 m²/g.

Preparation 6—Synthesis of Porous Polymeric Particles with 100 wt. % (100 mole %) Crosslinking (Invention)

This preparation was prepared the same as Control Preparation C1 except that the monomer mixture was 300 g ethylene glycol dimethacrylate. The resulting porous polymeric particles were 0.6 μm in median diameter and had a specific surface area of 200.9 m²/g.

Coating of Elements

Control Element C-1

A coating solution was prepared by mixing together the control porous polymeric particles of Preparation C1 with a binder of poly(vinyl alcohol) using Gohsenol GH 23® (Gohsen Nippon of Japan). The resulting coating solution was 15% solids and 85% water, with the solids being 85% porous polymeric particles and 15% poly(vinyl alcohol). The solution was stirred at 40° C. for approximately 30 minutes before coating.

The solution was then coated on corona discharge-treated, photographic grade, polyethylene-coated paper using a wound wire metering rod, to a wet lay down of 120 μm, and oven dried for 30 minutes at 60° C. This element was coated to a dry thickness of about 18 μm.

Control Element C-2 and C-3

These elements were prepared the same as Control Element C-1 except that the coating solutions were made using Preparations C2 and C3, respectively.

Elements 1–6 (Invention)

These elements were prepared the same as Control Element C-1 except that the coating solutions were made using Preparations 1–6, respectively.

Dry Time Evaluation

Each of the above coatings was imaged on an Epson 870® ink jet printer. The test target was a 9 inch long stripe of each color (cyan, magenta, yellow, black, red, green, blue). This target required about 3 minutes to print. Immediately after printing, the image was covered with bond copier paper and a weighted roller of about 7 kilograms was rolled over it. The bond paper was then pulled off.

The off set density of each color was measured at 3 inches down the page of bond paper from the last part printed, which would equal about 1 minute after printing, using an X-Rite® Reflection Densitometer with Status A filters. The average of all the colors was calculated. An average off set density of less than 0.7 is acceptable, which corresponds to an acceptable dry time. The following results were obtained:

TABLE 1

| Element | Average Off Set Density |
|---|---|
| Control C-1 | 0.82 |
| Control C-2 | 0.84 |
| Control C-3 | 0.76 |
| 1 | 0.63 |
| 2 | 0.57 |
| 3 | 0.49 |
| 4 | 0.38 |
| 5 | 0.23 |
| 6 | 0.0 |

The above results show that the control elements had an unacceptable off set density, while Elements 1 to 6 of the invention all had an acceptable of set density.

Example 2

Gloss

Preparation C4—Synthesis Control Porous Polymeric Particles with 50 wt. % (34 mole %) Crosslinking and a median diameter of 1.6 μm This preparation was prepared the same as Preparation 2 except that 0.82 g dioctyl ester of sodium sulfosuccinic acid (Aerosol OT-100®) was used and the crude emulsion was passed once through a Gaulin® colloid mill set at 3200 rev./min., 0.18 mm gap, and 5.7 kg/min. throughput. The resulting porous polymeric particles were 1.6 μm in median diameter.

Preparation 7—Synthesis of Porous Polymeric Particles with 50 wt. % (34 mole %) Crosslinking and a median diameter of 0.8 μm (Invention)

This preparation was prepared the same as Preparation 2 except that the crude emulsion was passed once through a Gaulin® colloid mill set at 3600 rev./min., 0.25 mm gap, and 3.8 kg/minute throughput. The resulting porous polymeric particles were 0.8 μm in median diameter.

Preparation 8—Synthesis of Porous Polymeric Particles with 50 wt. % (34 mole %) Crosslinking and a median diameter of 0.16 μm (Invention)

This preparation was prepared the same as Preparation 2 except that the crude emulsion was passed once through a Crepaco® homogenizer at 420 kg/cm² instead of a Gaulin® colloid mill. The resulting porous polymeric particles were 0.16 μm in median diameter.

Control Element C-4

This element was prepared the same as Control Element C-1 except that the coating solution was made using Preparation C4.

Elements 7–8 (Invention)

These elements were prepared the same as Control Element C-1 except that the coating solutions were made using Preparations 7 and 8 respectively.

Gloss Evaluation

Each of the above coatings and Element 2 from Example 1 were evaluated for 60 degree gloss using a Gardner® Gloss Meter. Glosses of greater than 15 are acceptable. The following results were obtained:

TABLE 2

| Element | Gloss |
|---|---|
| Control C-4 | 3 |
| 2 | 28 |
| 7 | 19 |
| 8 | 51 |

The above results show that Control C-4 had an unacceptable gloss while Elements 2, 7 and 8 of the invention having porous polymeric particles smaller than 1 μm had an acceptable gloss.

This invention has been described with particular reference to preferred embodiments thereof but it will be understood that modifications can be made within the spirit and scope of the invention.

What is claimed is:

1. An ink jet recording element comprising an opaque support having thereon an image-receiving layer comprising porous polymeric particles in a polymeric binder, said porous polymeric particles having a median diameter of less than 1 μm and having a degree of crosslinking of 27 mole % or greater, said porous polymeric particles being made from a styrenic or an acrylic monomer, and said polymeric binder consisting essentially of a poly(vinyl alcohol), a gelatin, a cellulose ether, poly(vinyl pyrrolidone) or poly(ethylene oxide).

2. The element of claim 1 wherein said acrylic monomer comprises methyl methacrylate or ethylene glycol dimethacrylate.

3. The element of claim 1 wherein said porous polymeric particles are cross-linked to a degree of crosslinking of at least 50 mole % or greater.

4. The element of claim 1 wherein said porous polymeric particles are cross-linked to a degree of crosslinking of about 100 mole %.

5. The element of claim 1 wherein said porous polymeric particles have a median diameter of less than 0.6 μm.

6. The element of claim 1 wherein said opaque support is paper or a voided plastic material.

7. The element of claim 1 wherein the porosity of said porous polymeric particles is achieved by mixing a porogen with the monomers used to make said polymeric particles, dispersing the resultant mixture in water, and polymerizing said monomers to form said porous polymeric particles.

8. The element of claim 1 wherein said porous polymeric particles have a surface area of 35 $m^2/g$ or greater.

9. The element of claim 1 wherein said porous polymeric particles have a surface area of 100 $m^2/g$ or greater.

* * * * *